Patented Aug. 17, 1954

2,686,776

UNITED STATES PATENT OFFICE 2,686,776

HYDROABIETYL- AND DEHYDROABIETYL-AMINO COMPOUNDS

Gerald I. Keim, Oxford, Pa., assignor to Hercules Powder Company, Wilmington, Del., a corporation of Delaware No Drawing. Application January 30, 1953, Serial No. 334,360

6 Claims. (Cl. 260—100)

This invention relates to rosin amine derivatives. More particularly it relates to compounds of the general formula

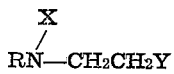

in which R represents the hydroabietyl or dehydroabietyl radicals, X represents hydrogen or a —CH$_2$CH$_2$Y radical, and Y represents a nitrile, carboxyl, or a methyl amine radical which is the same in each instance.

Compounds of the above formula in which Y represents a cyano radical are produced by condensing a rosin amine of the formula RNH$_2$, in which R is a hydroabietyl or dehydroabietyl radical, with acrylonitrile. When the condensation is effected with one mole acrylonitrile, the product in which X is hydrogen is produced, and when the condensation is effected with more than one mole acrylonitrile, the product in which X is —CH$_2$CH$_2$CN is produced.

The compounds of the general formula in which Y is a methyl amine group, —CH$_2$NH$_2$, are produced by hydrogenation of

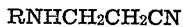

or RN(CH$_2$CH$_2$CN)$_2$ catalytically in the presence of free ammonia.

The products of the formula

and RN(CH$_2$CH$_2$COOH)$_2$ corresponding respectively to the compounds of the general formula in which X represents hydrogen and —CH$_2$CH$_2$Y, respectively, and Y represents —COOH in each instance are produced by alkaline hydrolysis of the corresponding nitriles, RNHCH$_2$CH$_2$CN and RN(CH$_2$CH$_2$CN)$_2$.

Following are specific examples of the preparation of these compounds using dehydrogenated rosin amine, which is largely dehydroabietylamine, as the starting material whereby compounds in which R is dehydroabietyl are produced. Parts are by weight.

Example 1

A mixture of 100 parts dehydrogenated (disproportionated) rosin amine and 75 parts acrylonitrile was placed in a glass container and sealed. The mixture was then heated at about 90° C. under autogenous pressure for 16 hours. The excess of unreacted acrylonitrile was removed by heating at 90° C. for 1 hour at 20 mm. pressure. The resulting product amounted to 117 parts and had a nitrogen analysis of 7.7 and a molecular weight of 331. The product was chiefly N-(β-cyanoethyl)dehydroabietylamine.

Example 2

A mixture of 100 parts dehydrogenated (disproportionated) rosin amine and 150 parts acrylonitrile was placed along with 3 parts copper acetate in a pressure vessel and sealed. After standing a few minutes at room temperature, the temperature gradually rose to about 40° C. When the temperature began to fall, the solution was then heated at about 90° C. for 16 hours. The excess acrylonitrile was removed by heating at 90° C. under a reduced pressure of about 20 mm. The resulting product amounting to about 134 parts analyzed 9.3% nitrogen and 416 molecular weight. It was substantially completely soluble when dissolved to a 10% solution in ethanol, indicating only minor amounts of acrylonitrile polymer, if any. The product was thus chiefly N-bis(β-cyanoethyl)dehydroabietylamine.

Example 3

A mixture of 100 parts N-(β-cyanoethyl)dehydroabietylamine of Example 1 in 100 parts methyl cyclohexane as a solvent was placed in a hydrogenation autoclave with 15 parts Raney nickel catalyst. To this mixture was then added 15 parts by weight ammonia and then hydrogen up to 3000 lb./sq. in. pressure. The autoclave was heated to 120° C. while rocking and held at that temperature for 4 hours. The maximum pressure was 5000 lb./sq. in. The product was removed from the catalyst by filtration and was recovered as the residue after distilling off the solvent. It was a viscous liquid which analyzed 7.22% nitrogen and 190 neutral equivalent. It was soluble in 5% acetic acid and very soluble in 5% formic acid. This corresponds to N-(gamma-aminopropyl)dehydroabietylamine.

Example 4

Example 3 was repeated with N-bis(β-cyanoethyl)dehydroabietylamine. The product after separation from the catalyst and solvent was a viscous liquid containing N-bis(gamma-aminopropyl)dehydroabietylamine.

Example 5

A solution of 25 parts N-(β-cyanoethyl)dehydroabietylamine in 75 parts alcoholic sodium hydroxide containing about 22 parts 45% aqueous sodium hydroxide was heated at about 80° C. for 16 hours. The resulting solution was diluted with water and then the aqueous solution was acidified with acetic acid to neutrality. N-(β-carboxyethyl) dehydroabietylamine precipitated as a white solid. This solid after recrystallization from benzene-methanol solution had a melting point 220–221° C. (with decomposition).

*Example 6*

A solution of 25 parts N-bis(β-cyanoethyl) dehydroabietylamine in 75 parts alcoholic sodium hydroxide containing about 22 parts 45% aqueous sodium hydroxide was heated at about 80° C. for 16 hours and was then freed of alcohol by boiling off the solvent. The residue was dissolved in 200 parts water and heated at 100° C. for 4 hours with slow distillation of the water, at which time ammonia was no longer being evolved. The residual material was dissolved in 200 parts water and was acidified with acetic acid to neutrality. The brown oil which separated was extracted with benzene and after distillation of the benzene was recovered as a brown brittle resin having a neutral equivalent of 270.

N-(β-cyanoethyl) dehydroabietylamine is made substantially free of N-bis(β-cyanoethyl) dehydroabietylamine by carrying out the reaction in the absence of a condensation catalyst in which case an excess of acrylonitrile may be present; or by carrying out the condensation in the presence of not more than one molecular proportion of acrylonitrile in the presence of a catalyst. In the absence of a catalyst, the reaction is more readily stopped after the reaction with the first acrylonitrile molecule is complete, since the rate of reaction of the initial product with the second molecule of acrylonitrile is much slower in the absence of a catalyst. The reaction temperature is in the range of 50–200° C. When a catalyst is used, temperatures as low as 50° C. lead to the condensation product in a reasonable length of time. In the absence of any catalyst, however, an undesirably long time is required at temperatures as low as 50° C. and a higher temperature will be used, particularly when it is desired to react two acrylonitrile molecules with the rosin amine. To effect reaction with the second acrylonitrile molecule in the absence of a catalyst, a temperature within the range of 150–200° C. will be found more satisfactory. The use of a catalyst even at these temperatures is preferred, however. Catalysts which are useful are: copper salts of organic or inorganic acids, organic or inorganic bases, mineral or organic acids, e. g., piperidine, trimethyl phenyl ammonium hydroxide, sodium hydroxide, acetic acid, sulfuric acid, and the like. To avoid polymerization of the acrylonitrile a polymerization inhibitor of the type used to prevent polymerization of acrylonitrile is generally used, e. g., copper oleate or diphenyl.

The hydrogenation of N-(β-cyanoethyl) stabilized rosin amines and N-bis(β-cyanoethyl) stabilized rosin amines is best carried out in the presence of free ammonia, which prevents dimerization, when simple reduction of the nitrile group with the production of the primary amine is desired. N-bis(β-cyanoethyl) stabilized rosin amines when reduced catalytically in the absence of ammonia, for example, often yield polymeric secondary amines and N-(β-cyanoethyl) stabilized rosin amines under similar conditions often yield the expected secondary amines. The hydrogenation is usually carried out by heating the nitrile with a Raney nickel catalyst under hydrogen pressure up to about 8000 lb./sq. in. The hydrogenation may also be carried out using other catalysts such as Raney cobalt, supported nickel or cobalt catalysts, and noble metal catalysts such as platinum, palladium, palladium-on-carbon, or reduced platinum oxide. The hydrogenation reaction may be carried out under hydrogen pressure of from about 200 to 8000 lb./sq. in. and at a temperature of from about 20° C. to about 200° C. The preferred temperature range is 100° C. to 160° C. Solvents may be used if desired and are preferable at the lower temperatures. The hydrogenation is preferably carried out in the presence of at least a molecular equivalent of ammonia.

The stabilized rosin amines from which the rosin amine derivatives of this invention are prepared are the stabilized rosin amines which are prepared by reacting ammonia with a stabilized rosin to form the nitrile from the carboxyl group in the rosin and then hydrogenating the rosin nitrile or modified rosin nitrile to form the amine. The preparation of the nitrile may be carried out by passing gaseous ammonia into the molten stabilized rosin material and vaporizing the water as fast as it is formed in order to remove the water from the reaction mixture. Dehydration catalysts may be used to facilitate the reaction with ammonia, if desired. The nitrile is preferably purified by neutralization or distillation to make it suitable for hydrogenation to the amine as the presence of acidic materials frequently destroys the hydrogenation catalyst. The nitrile may be formed from such stabilized rosins as hydrogenated rosin, or dehydrogenated or disproportionated rosin. The stabilized rosin nitriles may likewise be made from the stabilized rosin acids which are major constituents of these rosins such as dihydroabietic acid, dehydroabietic, and tetrahydroabietic acid.

The stabilized rosin acid nitriles prepared from the stabilized rosins or the corresponding rosin acids are readily hydrogenated to the amines by various methods known in the art. The conditions for hydrogenation of the nitriles of this invention as disclosed above are suitable and the hydrogenation may also be carried out in the absence of ammonia. The stabilized rosin amines are also produced, but less satisfactorily by hydrogenation of natural rosin nitrile or abietonitrile under such conditions of temperature, pressure, and time of hydrogenation as to hydrogenate the nucleus to convert the nitrile to hydrorosin amines which correspond to the amines produced from hydrogenated rosin via the nitriles.

The term "rosin amine" is used in this specification and claims to include broadly the primary amines derived from stabilized rosins or stabilized rosin acids in the manner indicated whereby the carboxyl of the rosin or rosin acid is converted into a —CH$_2$NH$_2$ group. Rosin amines included within this scope are dehydrogenated rosin amine derived from dehydrogenated rosin and containing chiefly dehydroabietylamine, hydrorosin amine derived from hydrogenated gum or wood rosin and containing chiefly dihydro- and tetrahydro-abietylamine; and the rosin amines derived from the pure stabilized rosin acids, namely, dihydroabietylamine, dehydroabietylamine, and tetrahydroabietylamine.

For convenience of expression in this specification, the hydroabietyl and dehydroabietyl radicals are referred to with the intention that they be considered broadly as covering rosin materials containing those radicals as major constituents.

Such rosin materials are the stabilized rosins such as hydrogenated and dehydrogenated (disproportionated) rosins. Thus, the products derived from hydrogenated rosin are considered to have hydroabietyl radicals as the major constituent, and dehydrogenated rosin is considered to have dehydroabietyl radicals as the major constituent. Hydroabietylamine is thus considered synonymous with hydrogenated rosin amine, and dehydroabietyl amine is considered synonymous with dehydrogenated rosin amine. It is not intended, however, to exclude the possibility of minor amounts of each of the various rosin amines in any of the rosin amines referred to by specific chemical names. The stabilized rosin amines are preferably free of abietylamine, since the corresponding derivatives wherein the abietyl radical is present do not have the same properties as the products of this invention. For example, the nitrile obtained by condensing a stabilized rosin amine with acrylonitrile can be incorporated in synthetic rubber latex by polymerization of the monomers forming the latex in the presence of this nitrile, thus forming a plasticized latex. This utility is not shared by the corresponding abietyl compound. Moreover, the acid obtained by hydrolysis of the nitrile is a superior emulsifier for use in the form of its salt in forming synthetic rubber latex by emulsion polymerization of butadiene-styrene monomers. The corresponding abietyl compound is much less effective. This improved characteristic of the products of this invention also extends to the diamines obtained by hydrogenation of the stabilized rosin amine acrylonitrile condensates. The diamines in the form of their acetic acid salts, for instance, are also useful emulsifying agents for the emulsion polymerization of synthetic rubber from butadiene and styrene. A similar emulsion polymerization using the corresponding abietyl compound as the emulsifier does not take place with equal facility and only low yields of a poor quality polymer are obtained. The difference in characteristics between these products prepared from stabilized rosin amines in the manner indicated and the products prepared from abietylamine by similar processes indicates a substantial difference which is more than one of degree and supports the supposition that abietylamine does not give structurally equivalent products.

In addition to the above indicated uses in producing polymer latex, the nitriles of the present invention provide starting material for the production of numerous useful products besides those indicated by way of example. Moreover, the amino compounds have corrosion inhibiting characteristics, are good flotation agents for silica, and when reacted with formaldehyde form products which can be resinified and are thus useful in paper treatment. The acidic compounds are amino acids and as such are capable of heat resinification. The dibasic amino acids can also be reacted with polyfunctional amines and alcohols for the production of resins. The amino acids are also useful stabilizers for highly chlorinated compounds such as chlorinated paraffin.

This application is a continuation-in-part of my copending application, Serial No. 197,510, filed November 24, 1950, now abandoned.

What I claim and desire to protect by Letters Patent is:

1. A stabilized rosin amine derivative of the formula

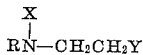

wherein R represents hydroabietyl, X represents a radical of the group consisting of hydrogen and —CH$_2$CH$_2$Y, and Y represents a radical of the group consisting of —CN, —COOH, and

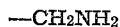

which is the same in each instance.

2. A stabilized rosin amine derivative of the formula RNHCH$_2$CH$_2$CN wherein R represents the hydroabietyl radical.

3. A stabilized rosin amine derivative of the formula RN(CH$_2$CH$_2$CN)$_2$ wherein R represents the hydroabietyl radical.

4. A stabilized rosin amine derivative of the formula RNHCH$_2$CH$_2$CH$_2$NH$_2$ wherein R represents the hydroabietyl radical.

5. A stabilized rosin amine derivative of the formula RN(CH$_2$CH$_2$CH$_2$NH$_2$)$_2$ wherein R represents the hydroabietyl radical.

6. A stabilized rosin amine derivative of the formula RNHCH$_2$CH$_2$COOH wherein R represents the hydroabietyl radical.

References Cited in the file of this patent

UNITED STATES PATENTS

| Number | Name | Date |
|---|---|---|
| 2,412,708 | Blair | Dec. 17, 1946 |
| 2,520,901 | Benoit | Sept. 5, 1950 |

FOREIGN PATENTS

| Number | Country | Date |
|---|---|---|
| 48,570 | France | Apr. 5, 1938 |
| 404,744 | Great Britain | Jan. 25, 1934 |